United States Patent

Rockenfeller et al.

Patent Number: 5,186,020
Date of Patent: Feb. 16, 1993

[54] PORTABLE COOLER

[75] Inventors: Uwe Rockenfeller; Lance D. Kirol, both of Boulder City, Nev.

[73] Assignee: Rocky Research, Boulder City, Nev.

[21] Appl. No.: 732,652

[22] Filed: Jul. 19, 1991

Related U.S. Application Data

[63] Continuation-in-part of Ser. No. 644,833, Jan. 23, 1991, abandoned.

[51] Int. Cl.⁵ .............................. F25B 17/00
[52] U.S. Cl. ..................... 62/457.9; 62/480; 62/114
[58] Field of Search ............ 62/457.9, 119, 480, 62/114

[56] References Cited

U.S. PATENT DOCUMENTS

| | | | |
|---|---|---|---|
| 992,560 | 5/1911 | Heuser | 62/480 |
| 2,167,264 | 7/1939 | Dunz | 62/480 |
| 2,496,459 | 2/1950 | Af Kleen | 62/480 |
| 2,715,817 | 8/1955 | Brodheim | 62/457.9 |
| 3,280,591 | 10/1966 | Webster | 62/457.9 |
| 3,411,318 | 11/1968 | Puckett | 62/457.9 |
| 4,205,531 | 6/1980 | Brunberg et al. | 62/480 |
| 4,638,646 | 1/1987 | Koseki et al. | 62/119 |
| 4,709,558 | 12/1987 | Matsushita et al. | 62/480 |
| 4,722,194 | 2/1988 | Kantor | 62/101 |
| 4,759,191 | 6/1988 | Thomas et al. | 62/101 |
| 4,822,391 | 4/1989 | Rockenfeller | 62/12 |
| 4,848,994 | 7/1989 | Rockenfeller | 62/4 |
| 4,875,915 | 10/1989 | Rockenfeller | 62/4 |
| 4,885,016 | 12/1989 | Griffiths | 62/532 |
| 4,901,535 | 2/1990 | Sabin et al. | 62/101 |
| 4,949,549 | 8/1990 | Steidl et al. | 62/101 |
| 4,956,977 | 9/1990 | Maier-Laxhuber et al. | 62/106 |
| 4,974,419 | 12/1990 | Sabin et al. | 62/101 |
| 4,993,239 | 2/1991 | Steidl et al. | 62/480 |
| 5,038,581 | 8/1991 | Maier-Laxhuber et al. | 62/457.9 |

*Primary Examiner*—Albert J. Makay
*Assistant Examiner*—William C. Doerrler
*Attorney, Agent, or Firm*—Jerry R. Seiler

[57] ABSTRACT

A portable cooling apparatus comprising a thermally insulated container having a cooling chamber therein, a lid providing access to the chamber, an evaporator including a heat exchange surface exposed in the cooling chamber, a reactor assembly secured adjacent the container comprising one or more reactors containing an ammoniated complex compound or coordinative complex compound of other suitable polar refrigerant, heating means for heating the complex compound, and a valved conduit for directing refrigerant between the reactor and the evaporator assembly. In another embodiment, the cooling apparatus comprises an inside reactor assembly, replacing the evaporator, and an outside reactor assembly each assembly containing a different complex compound.

49 Claims, 2 Drawing Sheets

PORTABLE COOLER

This application is a continuation-in-part of copending application Ser. No. 07/644,833 filed Jan. 23, 1991, now abandoned.

BACKGROUND OF THE INVENTION

Portable coolers or ice chests for keeping foods and beverages cold, are usually of a weight and size for being conveniently carried and transported by a user. Such coolers are thermally insulated to retain the cooling effect of ice or other pre-frozen cooling materials placed in the cooler chamber along with the foods or beverages. Inexpensive coolers are commonly made from materials such as expanded or foamed cellular polystyrene while more expensive containers incorporate rigid plastic container walls. Although ice is often readily available, replenishment of the ice or the cooling material may be quite inconvenient at a camping, picnic or recreational site. For larger coolers, sufficient quantities of ice may not be available for initially packing the cooling chamber. The presence of water in the cooler chamber from the melting ice is also often undesirable unless food containers and wrappers are waterproof and adequately sealed. Other portable coolers incorporate conventional refrigeration systems using freon or CFC's and small electrically powered compressors requiring 12-volt DC or 120 volt AC power sources, or Peltier effect systems. Once unplugged from the power source, these coolers no longer operate. In addition to portable coolers intended for recreational use, there exists a need for portable coolers capable of storing special goods, for example, medical products or other valuable or highly perishable materials within specific and critical temperature ranges for relatively long time periods advantageous when such goods are to be stored or shipped and where conventional refrigeration equipment is not available or is impractical.

The portable cooler of the present invention offers an alternative to using ice or other pre-frozen cooling materials, thereby obviating the disadvantages and inconvenience of using and replenishing ice common with the above-described coolers. Moreover, coolers of the invention do not require a source of electrical power for cooling operation. In another embodiment, a two reactor assembly apparatus is provided in which the evaporator is replaced by a reactor assembly. A different complex compound is used in each of the two reactor assemblies. Although such a power source is used to charge the system, once charged, the cooler will typically operate for hours without need of electrical power. In yet another embodiment, the evaporator and reactor, or two reactors, may be reversed to provide a heat storage container.

SUMMARY OF THE INVENTION

The apparatus of the present invention comprises a portable cooler assembly including a container having a cooling cavity or chamber, an evaporator in thermal communication with the cooling chamber, a reactor assembly comprising one or more reactors containing a complex compound of ammonia or other suitable polar refrigerant and one or more metal salts, means for heating the complex compound within the reactor, and a valved conduit for directing the refrigerant between the reactor assembly and the evaporator. The evaporator and reactor components may be permanently installed in the portable cooler, or may be removable. In operating the cooler, prior to cooling use, the reactors are heated to desorb the refrigerant which is directed to the evaporator. A valve or other closure member in the refrigerant conduit between the evaporator and the reactors is opened to commence the cooling operation. In another embodiment, or two reactor assembly apparatus is provided in which the evaporator is replaced by a reactor assembly. A different complex compound is used in each of the reactor assemblies. The advantages of the apparatus and components and the operation will be more fully explained in the following detailed description.

DETAILED DESCRIPTION OF THE INVENTION

Figure 1:
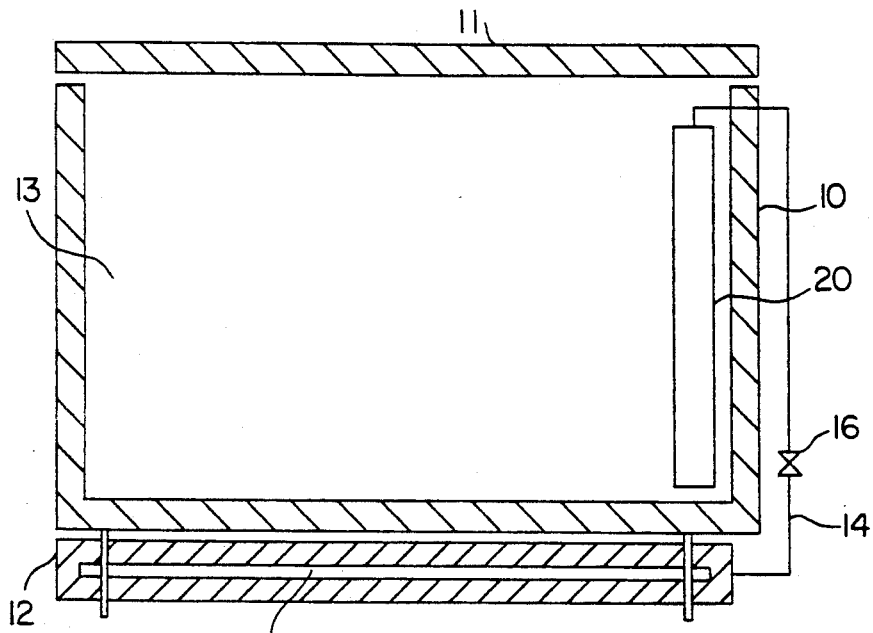
FIG. 1 is a schematic side-view of the interior of the portable cooler illustrating the components.

Shown in FIG. 1, the basic apparatus comprises a container 10 having sidewalls, a bottom and a lid 11 for accessing the interior cavity or chamber 13 in which food, beverages or other goods to be cooled or maintained at a relatively cool temperature are placed. An evaporator 20 is located and positioned within the chamber so that it is thermally exposed to the chamber interior whereby cooling from the evaporator surface is efficiently transferred to the goods within the chamber. A reactor assembly 12 is secured on the exterior of the container so that it is exposed to ambient air temperature conditions. A conduit 14, cooperating with a valve 16, directs ammonia between the reactor assembly and evaporator. In the schematic apparatus illustrated in FIG. 1, the reactor shown includes a heater which provides heat for the complex compound present in the reactor, the purpose of which will be explained more fully hereinafter.

Figure 2:
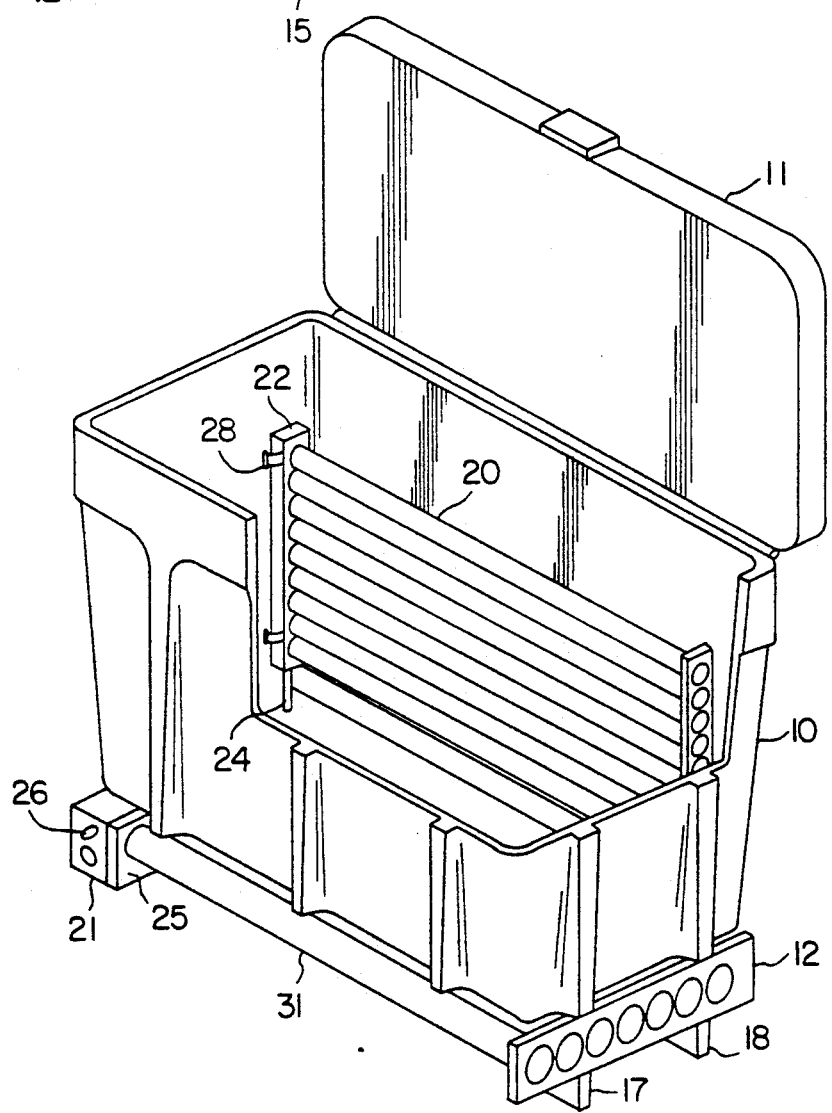
FIG. 2 is a perspective view of a portable cooler of the invention, partially cut-away to expose the interior of the container.
Figure 4:
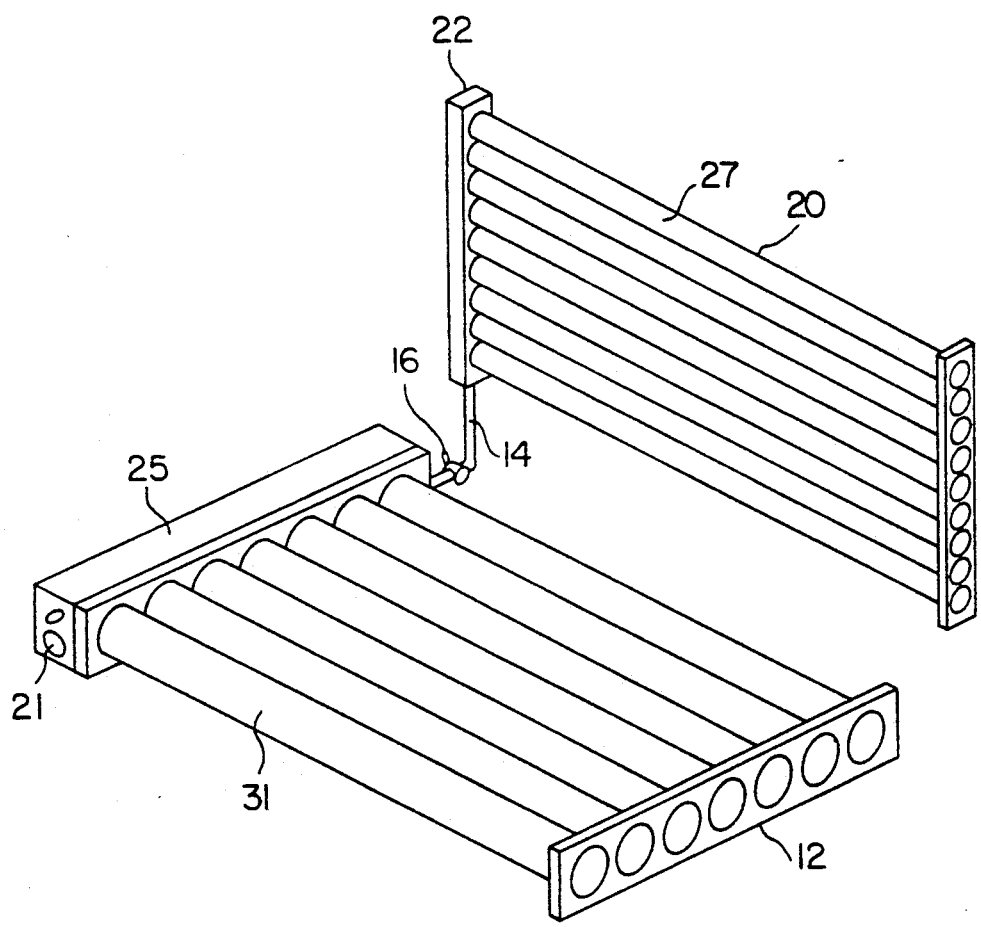
FIG. 4 is a perspective view of the reactor and evaporator components, illustrating another embodiment of the invention.

Referring also to FIGS. 2 and 4, reactor assembly 12 includes one or more reactors 31 containing the complex compounds of a polar refrigerant and a solid metal salt. These complex compounds comprise chlorides, bromides, sulphates and chlorates of metals selected from the group consisting of an alkali and alkaline earth metal, chromium, manganese, iron, cobalt, nickel, cadmium, tantalum and rhenium, or a double metal chloride salt, complexed with a polar refrigerant, capable of forming coordinative bonds with the salt. Another salt of special interest is Na $BF_4$. Example of polar refrigerants suitable for forming such complexes comprise ammonia, water, lower alkanols, especially methanol, amines, especially methylamine, sulfur dioxide, and phosphine. It is to be understood that by reference hereinafter to the preferred refrigerant, ammonia, other suitable polar refrigerants are also intended. The salts generally suitable for the invention are disclosed in U.S. Pat. No. 4,848,994, the description of which is incorporated herein by reference. The preferred ammoniated complex compounds used in the apparatus of the invention are selected from the group consisting of LiCl.0-3

(NH$_3$), BaCl$_2$.0-8(NH$_3$), CaCl$_2$.4-8(NH$_3$), CaCl$_2$.2-4(NH$_3$), CoCl$_2$.2-6 (NH$_3$), SrCl$_2$.1-8(NH$_3$), SrBr$_2$.0-8(NH$_3$), CaBr$_2$.2-6(NH$_3$), NiCl$_2$.2-6(NH$_3$), FeCl$_2$.2-6 (NH$_3$), Na BF$_4$.0.5-2.5 (NH$_3$), and the ammoniated double metal chloride salts disclosed in the aforesaid incorporated patent. The LiCl complexes include a number of coordination steps between 0 and 3. The most preferred complexes are those of SrCl$_2$ and CaCl$_2$. The compound in the reactor may be a complex compound of a single metal salt, or, a mixture of salts may be used. For example, where rate of adsorption and/or desorption is important for quick cool down, load control, etc., one or more additional salts may be used to take advantage of complex compounds having such properties.

In operating the apparatus of the invention, the complex compounds alternately adsorb and desorb ammonia which is alternately directed to and from the evaporator. When charging or re-charging the system, prior to the cooling operation, the complex compound in the reactors is heated by internal or external heating means causing ammonia desorption in an endothermic reaction. The reactors are preferably completely charged by desorbing substantially all of the ammonia that can be desorbed at the temperature to which the reactors are heated. The desorbed ammonia is discharged to the evaporator, where it is now acting as a condenser, is cooled by exposure to ambient temperature conditions. Cooling of the evaporator during the charging cycle is preferably accomplished by exposure of the exterior of the evaporator coil, plate or tubes to air. If desired, evaporator cooling with forced air or other cooling means may also be used.

Figure 3:
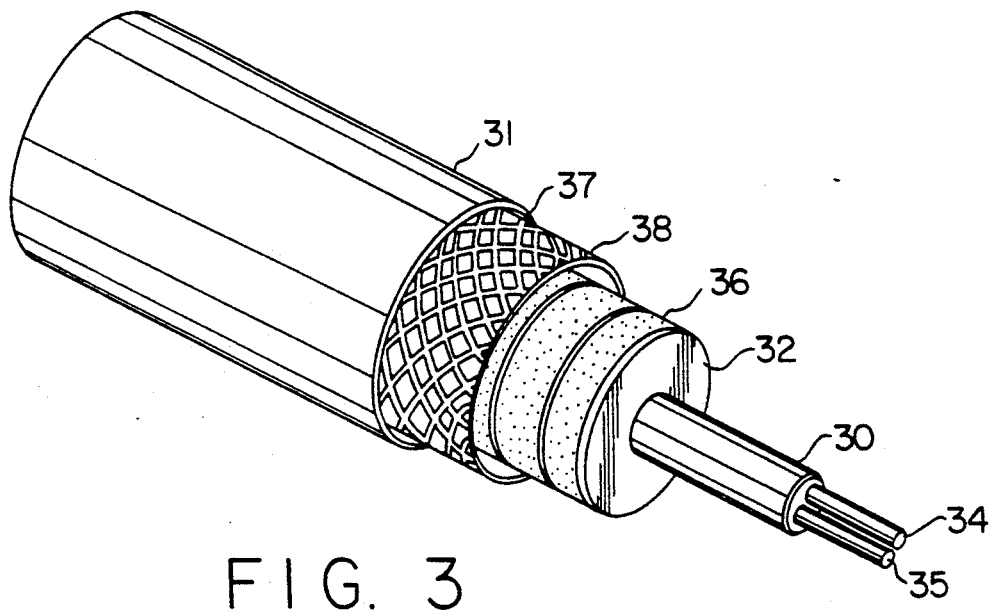
FIG. 3 is a detailed illustration of one embodiment of a reactor design.

In a preferred embodiment, the reactor assembly includes internal heating means, preferably electrical resistance heating elements in the form of wires or the like within each reactor. One design of such a reactor is illustrated in FIG. 3 with electrical resistance wires 34 and 35 extending within a heater core 30 which becomes heated as electrical current is supplied to the wires. Heat exchange fins 32 in thermal contact with heater core 30 assist in directing heat to the layers of complex compounds 36 located between the fins. As the complex compound is heated, ammonia is desorbed and passes through gas-permeable liner 38, comprising a material such as woven fiberglass, wire mesh, gas permeable foam, fire brick, etc. into the open space within the housing or tube 37. The ammonia is then directed via manifold 25 and conduit 14, to the evaporator assembly 20. Valve 16, when opened, allows ammonia to flow between the evaporator and reactor assembly components. The reactor design illustrated in FIG. 3 is only one example of such a reactor, and other reactor systems and shapes may be used, such as described in co-pending U.S. patent application, Ser. No. 07/320,652, filed Mar. 8, 1989, the description of which is incorporated herein by reference.

In the preferred design shown, the reactor assembly may include an electrical socket 21, or an electrical outlet, for supplying electrical current to the reactor heaters. However, the reactor assembly may also be provided with a permanent power cord for plugging it into a suitable electric outlet, although a removable cord is preferable since the apparatus is to be portable and the presence of a cord maybe disadvantageous, both from a standpoint of physical inconvenience as well as the wear or damage likely caused to a permanent cord. The reactor assembly may also be provided with an internal transformer and switching means for the alternate use of AC or DC power. For this purpose, the reactor assembly may also be provided with a suitable electrical outlet for attaching a DC extension cord so that the appliance could be recharged with a battery power source, for example, a lighter outlet commonly found in a vehicle. Also illustrated in the reactor assembly and exposed on the distribution manifold 25 is a pinch-off tube 26 through which ammonia may be charged. Any suitable location and design of a gas charge means may be used.

In one embodiment, the portable cooler assembly may be assembled with the reactor and evaporator components permanently installed. The location and positioning of the evaporator within the cooling chamber is for convenience as well as efficiency, and it may be positioned on the bottom, top, and/or along one or more of the sides of the interior chamber of the container. The exterior of the evaporator assembly conduits or coils may be covered with a film or material that provides for efficient heat exchange, but which will protect the coils from damage, or the coils may be directly exposed within the cooling chamber as illustrated in FIG. 2. Also shown is a built-in conduit 24 for directing ammonia between the reactor and evaporator component. In the embodiment illustrated, support legs 17 and 18 extend at the bottom of the cooler for support and also to protect the reactor tubes 31, which are also preferably exposed to ambient conditions for convective cooling by the surrounding air or by using a fan or other cooling means. As an alternative to a conventional evaporator shape illustrated in the drawings, the evaporator may be designed to more efficiently cool goods or containers of goods or products to be stored or transported in the cooler. For example, where tubes, vial or modules of medicines or the like are to be cooled, the evaporator may be a block with one or more cavities, or comprise a coil or other means shaped to hold single or multiple containers. Thus, depending on the size or capacity of the cooler and evaporator, the latter may be designed and shaped to accommodate, hold, nest, surround, and/or cover any desired goods and/or containers for such goods.

To initiate the cooling cycle, valve 16 is opened and the condensed ammonia in evaporator 20 evaporates, thereby cooling the evaporator coils or tubes 27. The evaporating ammonia from the tubes 27 flows through condenser manifold 22, conduit 14 and is directed into reactor manifold 25 and distributed into reactors 31 where it is adsorbed into the complex compound mass within the reactors in a exothermic reaction. Thus, it is important to keep the reactor assembly tubes exposed to ambient conditions whereby they are cooled by convective air.

In another embodiment, the reactor and evaporator assembly components may be removable from the container where such a design is desired or advantageous. For example, where extended or continuous use of the cooler is desired, with a removable evaporator and reactor design, these components could be exchanged for recharged components, with cooling then continued without substantial interruption for recharging. With such a design once an evaporator has been completely discharged with substantially all of the ammonia evaporated and adsorbed in the reactors, these components can be removed from the container, and other reactor and evaporator components which have been recharged as previously described, installed. Of course, such an embodiment would require suitable valves on the reactor and evaporator components for connecting and disconnecting them to the conduit system installed in the container.

Another embodiment of the invention includes a system in which the entire functioning assembly of the assembly is removable and replaceable. An example of the apparatus is illustrated in FIG. 4 with the evaporator, reactor and conduit and valve components being removable from a cooler as a unit or as individual components, but which may be installed in any cooling container which can accept the components or on which they can be secured. The conduit may also be in the form of a relatively flexible hose, whereby it may be more easily installed. Valve 16 is used for selectively directing the ammonia to and from the reactor and evaporator components, and which may be installed in different coolers, and if desired, removed for recharging. Such an assembly may also include suitable brackets (not shown) for attaching the reactor assembly to the exterior of the cooler on which it is to be installed. Brackets or means for securing the evaporator within the cooling chamber may be used, or the lid may be shaped or notched for mounting the evaporator on the lid. This embodiment may be especially useful on relatively inexpensive foamed styrene coolers with only the necessity of forming a hole or notch in the container for installing the conduit between the evaporator and reactor components. Clips, straps or the like could be provided for securing the reactor assembly and using a flexible conduit 14, the evaporator could be placed where desired in the cooling chamber.

The apparatus of the invention may include a plurality of evaporators using a single reactor assembly, by providing multiple conduits from the reactor assembly. It may also be beneficial or preferred to incorporate a receiver or ammonia reservoir cooperating with the evaporator. Multiple reactor assemblies may be used for single or multiple evaporators where desired or otherwise advantageous.

In another embodiment, the apparatus of the invention incorporates two reactor systems comprising first and second reactor assemblies, each comprising one or more reactors. The first reactors are provided with a different ammonia-salt complex, from the complex (or other suitable polar refrigerant-salt complex) present in the second reactors, whereby ammonia flows between the reactors containing the two different salts as they alternately adsorb or desorb ammonia in exothermic and endothermic reactions, respectively. In such an apparatus, ammonia does not go through a liquid/gas phase change, and the evaporator is replaced by a reactor assembly that cools the cooling chamber as the complex compound therein desorbs ammonia. In this embodiment, it is important that the different complex compounds in the two reactor assemblies have equilibrium temperatures differential of between about 20° C. and 150° C. The term "equilibrium temperature differential" is intended to mean the difference between any two different complex compound equilibrium temperatures at the same or substantially the same operating pressure, typically between about 0.1 and about 30 bars in the apparatus of the invention. Such an equilibrium temperature differential will provide sufficient practical temperature lift and yet be within practical and safe ranges for heat rejection during exothermic ammonia adsorption. In the cooling or inside reactor assembly, i.e., the reactors located in the cooling chamber for providing cooling during ammonia desorption, the preferred complex compounds are the ammoniated $BaCl_2$, $CaCl_2$, $NaBF_4$ and $SrCl_2$ complex compounds previously disclosed. The preferred ammonia complex compounds used in the outside, second reactors in this embodiment are $LiCl.0-3(NH_3)$, $SrBr_2.0-8(NH_3)$, $CaBr_2.2-6(NH_3)$, $CaCl_2.2-4(NH_3)$, $SrCl_2.1-8(NH_3)$, $CoCl_2.2-6\ (NH_3)$, $NiCl_2.2-6(NH_3)$, $FeCl_2.2-6(NH_3)$ $SnCl_2.0-2.5(NH_3)$, $NaBF_4.0.5-2.5\,(NH_3)$.

This reactor construction of the two reactor system is as previously described for the single reactor apparatus. Only the outside reactors need incorporate a heating means for heating the complex compound therein since the inside reactors will adsorb and desorb ammonia at ambient temperature conditions. To charge the apparatus, the outside reactors are heated to desorb ammonia which is directed to the cooling reactors where it is adsorbed in the s..it in an exothermic reaction. When the apparatus is to be used for cooling, the valve between the first and second reactors is opened, and because of the equilibrium pressure difference between the two complexes, ammonia is desorbed from the cooling reactors in an endothermic reaction which cools the chamber. The dual reactor system coolers are preferably used where cooling chamber temperatures between about 5° C. and about 20° C. are suitable. In a reactor incorporating, ammonia $SrBr_2$ complexes, it is desirable to avoid heating the composition to temperatures above about 110° C. due to melting of the complexes under certain operating conditions. It is also to be understood that the complex compound in the first or inside reactors must have a higher equilibrium pressure than the complex compound in the second, outside reactors, at any given operating pressure.

In a specific example of portable cooler according to the invention, a 30 liter cooling chamber incorporates a reactor assembly comprising nine complex compound reactors, each of 1.625" diameter with the reactor tubes 24" long containing a total of 2.6 kg of $SrCl_2$ solid adsorbent salt, and using the reactor configuration illustrated in FIG. 3. The evaporator design comprises ten evaporator tubes, each 24" long with a 1" OD to provide a total evaporator volume of about 2,700 cc. Such a configuration results in a cooling equivalent of about 10 pounds of ice. Of course, such a specific cooler is only by way of example and the reactor and evaporator components may be of any suitable size and configuration.

Cooling chamber temperatures in a portable cooler of the present invention are between about −20° C. and 25° C. depending on the salt and complex used and the rate of ammonia evaporation. However, the invention is not to be so limited and, if desired, may be designed to achieve cooler temperatures, for example, down to −70° C., where using a suitable refrigerant. Normal practical operating pressures in the system are between about 0.1 and about 30 bars. A thermostat or other means of regulating the ammonia evaporation rate may be used, for example, a temperature control incorporating a throttling valve in the ammonia vapor conduit line for controlling the refrigerant bleed control rate. In another embodiment, the reactor assembly may be designed as a pull-out type that may be heated by other heating means. Moreover, the size and shape of the cooler and the components described herein are not to be limited to those shown in the drawings. Thus, a cooler of the invention may be relatively small, for example, less than a quart volume capacity, up to a 100-250 gallon size or larger, which may be mounted to or transported in a truck bed, or the like. For usual recreational portability, containers up to about 40 gallons are suitable. Where the container is to be used for storing or transporting specific containers or goods, it may be designed, shaped, and insulated to accommodate such a container, or containers. For example, where vials, tubes or other containers for medicines, biological samples, specimens, organs or the like are to be stored or transported, the container may be constructed and designed to meet the cooling capacity requirements including adequate reactor capacity, insulation, and temperature control means, for maintaining necessary cooling chamber temperatures for up to at least about 100-150 hours or more. The apparatus of the invention may also be combined with a conventional refrigeration system. For example, it may be constructed to include conventional electrically operated refrigeration components, and preferably, manual and/or automatic switching means for operating the reactor assembly of the invention when electrical power to the conventional refrigeration components is interrupted.

Although the invention has been described in terms of a cooler, it may also be modified to function as a heating or heat storage container. In such an embodiment, the evaporator and the reactor assembly may simply be reversed, so that the reactor components are located in the chamber of the container, and the evaporator assembly located outside. Such an alternative use of the equipment may be readily accomplished where the evaporator and reactor components are removable as previously described. Where each of these components are of a size to be installed in the container, they may be interchanged for transforming the container for use as either, or both, a cooler and/or a heat storage case, as desired. This same interchangeability may be taken advantage of using the two reactor embodiment previously described. In either alternative, temperatures within the container using the described heat producing reactor components will provide interior temperatures from about 50° F. to about 600° F., where ammonia is the refrigerant, and even higher for certain other refrigerants. Of course, the practical limits for such heating will also depend on the materials used for container construction, insulation, safety requirements, etc. Such modifications and embodiments within the scope of the invention described herein will be evident to those skilled in the art as well as the advantages and uses hereof.

What is claimed:

1. A portable cooler capable of being repeatedly charged at a first location and after each such charge selectively discharged at a selected time and at a selected second location comprising:
   a container having a cooling chamber therein,
   an evaporator in thermal communication with said cooling chamber,
   a reactor assembly comprising one or more reactors each containing a complex compound formed by adsorbing ammonia on a chloride, bromide, sulphate or chlorate salt of a metal selected from the group consisting of an alkali and alkaline earth metal, chromium, manganese, iron, cobalt, nickel, cadmium, tantalum and rhenium, or a double metal chloride salt,
   means for charging said portable cooler comprising heating means for being connected to a source of electrical power and in thermal contact with said complex compound for heating said complex compound in said one or more reactors for desorbing said ammonia therefrom during said charging, conduit means extending between said one or more reactors and said evaporator and in communication therewith for directing said ammonia therebetween, and
   a valve means cooperating with said conduit means for selectively directing ammonia from said evaporator to said one or more reactors during discharge for cooling said cooling chamber when said heating means is disconnected from said source of electrical power.

2. A portable cooler of claim 1 wherein said reactors contain a complex compound selected from the group consisting of $LiCl.0-3(NH_3BaCl_2.0-8(NH_3)$, $CaCl_2.0(NH_3)$, $CaCl_2.2-4(NH_3CoCl_2.2-6(NH_3)$, $SrCl_2.1-8(NH_3)$, $SrBr_2.0-8(NH_3)$, $CaBr_2.2-6(NH_3)$, $NiCl_2.2-6(NH_3)$, $NiCl_2.2-6(NH_3)$, $FeCl_2.2-6(NH_3)$ and $NaBF_4.0.5-2.5(NH_3)$, and mixtures thereof.

3. A portable cooler of claim 1 wherein said heating means comprises an electrical resistance heater in thermal communication with said complex compound in said one or more reactors.

4. A portable cooler of claim 3 including means for selectively disengaging said electrical resistance heater from a source of electrical power.

5. A portable cooler of claim 4 wherein said reactors comprise elongated reactor chambers containing a core of said complex compound extending therealong.

6. A portable cooler of claim 5 wherein said reactors include one or more heat transfer surfaces in thermal communication with said complex compound and said electrical resistance heater.

7. A portable cooler of claim 1 wherein said cooling chamber is of any capacity up to about 250 gallons.

8. An apparatus of claim 4 including an electrical plug or receptacle for removably connecting an electrical power source for energizing said electrical resistance heater.

9. An apparatus of claim 1 including battery means for supplying electrical power to said heating means.

10. An apparatus of claim 7 including handle means secured to said container.

11. An apparatus of claim 1 wherein said reactor assembly is removably secured to the exterior of said container.

12. An apparatus of claim 1 wherein said evaporator assembly is removably secured in said container.

13. An apparatus of claim 1 wherein said complex compound is an ammoniated compound of $BaCl_2$, $SrCl_2$, $CaCl_2$, $SrBr_2$, $LiCl$, $CaBr_2$ or a double metal chloride salt.

14. An apparatus of claim 1 wherein said metal salt is $SrCl_2$.

15. An apparatus of claim 1 wherein said metal salt is $CaCl_2$.

16. An apparatus of claim 1 wherein said metal salt is $SrBr_2$.

17. An apparatus of claim 1 wherein said metal salt is $LiCl$.

18. An apparatus of claim 1 wherein said metal salt is $BaCl_2$.

19. An apparatus of claim 1 wherein said metal salt is $CaBr_2$.

20. An apparatus of claim 1 wherein said metal salt is a double chloride salt.

21. A portable cooler comprising:
   a thermally insulated container having a cooling chamber therein,
   a first reactor assembly comprising one or more first reactors exposed in said cooling chamber and a second reactor assembly comprising one or more second reactors exposed exteriorly of said container, said first and second reactors containing a complex compound of ammonia and a chloride, bromide, sulphate or chlorate of a metal salt selected from the group consisting of an alkali and alkaline earth metal, chromium, manganese, iron, cobalt, nickel, cadmium, tantalum and rhenium, or a double metal chloride salt, wherein the equilibrium temperature of the complex compound in said first reactors differs from the equilibrium temperature of the complex compound in said second reactor by between about 20° C. and about 150° C. at the same operating pressure.

22. A portable cooler of claim 21 including means for heating said complex compound in said second reactor assembly.

23. A portable cooler of claim 22 wherein said means for heating comprises an electrical resistance heater.

24. A portable cooler of claim 23 including means for selectively disengaging said electrical resistance heater from a source of electrical power.

25. A portable cooler of claim 24 wherein said reactors comprise elongated reactor chambers containing a core of said complex, compound extending therealong.

26. A portable cooler of claim 25 said reactors include one or more heat transfer surfaces in thermal communication with said complex compound and said electrical resistance heater.

27. A portable cooler of claim 21 wherein said cooling chamber is of any capacity up to about 250 gallons.

28. A portable cooling apparatus comprising:
   a thermally insulated container having a cooling chamber therein,
   one or more first reactors exposed in said cooling chamber and having a complex compound therein selected from the group consisting of $BaCl_2.0-8(NH_3)$, $CaCl_2.4-8(NH_3)$, $CaCl_2.2-4(NH_3)$, $NaBF_4.5-2.5(NH_3)$ and $SrCl_2.1-8(NH_3)$,
   one or more second reactors secured on the exterior of said container and having a complex compound therein different from said first reactors and selected from the group consisting of $LiCl.0-3(NH_3)$, $SrBr_2.0-8(NH_3)$, $CaBr_2.2-6(NH_3)$, $CaCl_2.2-4(NH_3)$, $CoCl_2.2-6(NH_3)$, $SrCl_2.1-8(NH_3)$, $NiCl_2.2-6(NH_3)$, $FeCl_2$ $2-6(NH_3)$ $SnCl_2.0-2.5(NH_3)$, $NaBF_4.0.5-2.5(NH_3)$
   means for selectively heating said second reactors for desorbing ammonia from said complex compound, and
   means for directing ammonia between said first and second reactors.

29. A portable cooling assembly capable of being repeatedly charged at a first location and after each such charge selectively discharged at a selected time and at a selected second location and capable of being installed in a portable cooler comprising:
   an evaporator comprising a tubular assembly for being removably installed in the cooling chamber of said portable cooler,
   a reactor assembly comprising one or more reactors containing a complex compound formed by adsorbing ammonia on a chloride, bromide, sulphate or chlorate salt of a metal selected from the group consisting of an alkali and alkaline earth metal, chromium, manganese, iron, cobalt, nickel, cadmium, tantalum and rhenium, or a double metal chloride salt,
   means for charging said assembly comprising heating means for being connected to a source of electrical power and in thermal contact with said complex compound for heating said complex compound in said one or more reactors for desorbing said ammonia therefrom during said charging, conduit means extending between said one or more reactors and said evaporator and in communication therewith for directing said ammonia therebetween, and
   a valve means cooperating with said conduit means for selectively directing ammonia from said evaporator to said one or more reactors during discharge for cooling said cooling chamber when said heating means is disconnected from said source of electrical power.

30. An assembly of claim 29 including means for securing said reactor assembly on the exterior of said cooler.

31. An assembly of claim 30 wherein said reactors include an electrical resistance heating element in thermal communication with said complex compound for heating said complex compounds.

32. A portable cooler capable of being repeatedly charged at a first location and after each such charge selectively discharged at a selected time and at a selected second location comprising:
   a container having a cooling chamber therein, an evaporator in thermal communication with said cooling chamber,
   a reactor assembly comprising one or more reactors each containing a complex compound formed by adsorbing ammonia on a chloride, bromide, sulphate or chlorate salt of a metal selected from the group consisting of an alkali and alkaline earth metal, chromium, manganese, iron, cobalt, nickel, cadmium, tantalum and rhenium, or a double metal chloride salt,
   means for charging said portable cooler comprising heating means for being connected to a source of electrical power and in thermal contact with said complex compound for heating said complex compound in said one or more reactors for desorbing said ammonia therefrom during said charging, conduit means extending between said one or more reactors and said evaporator and in communication therewith for directing said ammonia therebetween, and
   a valve means cooperating with said conduit means for selectively directing ammonia from said evaporator to said one or more reactors during discharge for cooling said cooling chamber when said heating means is disconnected from said source of electrical power.

33. A portable cooler of claim 32 wherein said heating means comprises an electrical resistance heater in thermal communication with said complex compound in said one or more reactors.

34. A portable cooler of claim 33 wherein said reactors comprise elongated reactor chambers containing a core of said complex compound extending therealong, and wherein said reactors include one or more heat transfer surfaces in thermal communication with said complex compound and said electrical resistance heater.

35. A portable cooler of claim 32 wherein said cooling chamber is of any capacity up to about 250 gallons.

36. A portable cooling apparatus comprising:
   a thermally insulated container having a cooling chamber therein,
   one or more first reactors exposed in said cooling chamber and one or more second reactors exposed exteriorly of said container, said first and second reactors containing a complex compound of a polar refrigerant and a chloride, bromide, sulphate or chlorate of a metal salt selected from the group consisting of an alkali and alkaline earth metal, chromium, manganese, iron, cobalt, nickel, cadmium, tantalum and rhenium, or a double metal chloride salt, wherein the equilibrium temperature of the complex compound in said first reactors differs from the equilibrium temperature of the complex compound in said second reactors by between about 20° C. and about 150° C. at the same operating pressure.

37. A portable cooling apparatus of claim 36 including electrical resistance heating means for heating said second reactors.

38. A portable cooler of claim 37 wherein said reactors comprise elongated reactor chambers containing a core of said complex compound extending therealong, and wherein said reactors include one or more heat transfer surfaces in thermal communication with said complex compound and said electrical resistance heating means.

39. A portable cooler of claim 36 wherein said cooling chamber is of any capacity up to about 250 gallons.

40. A portable container capable of being repeatedly charged at a first location and after each such charge selectively discharged at a selected time and at a selected second location and having a chamber therein,
   a reactor assembly comprising one or more reaction chambers each containing a complex compound formed by adsorbing a polar refrigerant on a chloride, bromide, sulphate or chlorate salt or a metal selected from the group consisting of an alkali and alkaline earth metal, chromium, manganese, iron, cobalt, nickel, cadmium, tantalum and rhenium, or a double metal chloride salt, said complex compound capable of having a substantially increased volume and a first density if allowed to expand without volumeric restriction during adsorption of said polar refrigerant on said salt, said reaction chambers having means for limiting the volumeric expansion of said complex compound, and wherein said complex compound fills said reaction chamber and has a second density, greater than said first density,
   an evaporator, means for charging sd portable container comprising heating means for being connected to a source of electrical power and in thermal contact with said complex compound for heating said complex compound in said one or more reactors for desorbing said polar refrigerant therefrom during said charging,
   conduit means extending between said one or more reactors and said evaporator and in communication therewith for directing polar refrigerant therebetween, and
   a valve means cooperating with said conduit means for selectively directing polar refrigerant from said evaporator to said one or more reactors during discharge when said heating means is disconnected from said source of electrical power, and wherein said evaporator and said reactor assembly are each capable of being removably secured in said chamber and outside of said chamber, for selectively heating and cooling said chamber, respectively.

41. A portable apparatus comprising:
   a thermally insulated container having a chamber therein,
   a first reactor assembly comprising one or more first reactors and a second reactor assembly comprising one or more second reactors, said first and second reactors containing a complex compound of a polar refrigerant and a chloride, bromide, sulphate or chlorate of a metal salt selected from the group consisting of an alkali and alkaline earth metal, chromium, manganese, iron, cobalt, nickel, cadmium, tantalum and rhenium, or a double metal chloride salt, wherein the equilibrium temperature of the complex compound in said first reactors differs from the equilibrium temperature of the complex compound in said second reactors by between about 20° C. and about 150° C. at the same operating pressure, said first and said second reactor assemblies being interchangeably secured inside and outside said chamber, respectively, for selectively heating and cooling said chamber.

42. A portable cooler capable of being repeatedly charged at a first location and after each such charge selectively discharged at a selected time and at a selected second location comprising:
   a thermally insulated container having a cooling chamber therein,
   a first reactor assembly comprising one or more first reactors exposed in said cooling chamber and a second reactor assembly comprising one or more second reactors exposed exteriorly of said container, said first and second reactors containing a complex compound formed by adsorbing ammonia on a chloride, bromide, sulphate or chlorate of a metal salt selected from the group consisting of an alkali and alkaline earth metal, chromium, manganese, iron, cobalt, nickel, cadmium, tantalum and rhenium, or a double metal chloride salt, wherein the equilibrium temperature of the complex compound in said firs reactors differs from the equilibrium temperature of the complex compound in said second reactor by between about 20° C. and about 150° C. at the same operating pressure,
   means for charging said portable cooler comprising heating means for being connected to a source of electrical power and in thermal contact with said complex compound for heating said complex compound in said one or more second reactors for desorbing said ammonia therefrom during said charging,
   conduit means extending between said first reactor assembly and said second reactor assembly and in communication therewith for directing said ammonia therebetween, and
   a valve means cooperating with said conduit means for selectively directing ammonia from said first reactor assembly to said second reactor assembly during discharge for cooling said cooling chamber when said heating means is disconnected from said source of electrical power.

43. A portable cooler of claim 42 wherein said heating means comprises an electrical resistance heating element in thermal communication with said complex compound in said one or more second reactors.

44. A portable cooler of claim 43 including means for selectively disengaging said electrical resistance heater from a source of electrical power.

45. A portable cooler of claim 44 wherein said reactors comprise elongated reactor chambers containing a core of sid complex compound extending therealong.

46. A portable cooler of claim 45 wherein said reactors include one or more heat transfer surfaces in thermal communication with said complex compound and said electrical resistance heater.

47. A portable cooler of claim 42 wherein said cooling chamber is of any capacity up to about 250 gallons.

48. A portable cooler of claim 42 wherein said one or more first reactors contain a complex compound therein selected from the group consisting of $BaCl_2.0-8(NH_3)$, $CaCl_2.4-8(NH_3)$, $CaCl_2.2-4(NH_3)$, $NaBF_4.0-.5-2.5(NH_3)$ and $SrCl_2.1-8(NH_3)$; and said one or more second reactors contain a complex compound therein different from said first reactors and selected from the group consisting of $LiCl.0-3(NH_3)$, $SrBr_2.0-8(NH_3)$, $CaBr_2.2-6(NHp_3)$, $CaCl_2.2-4(NH_3)$, $CoCl_2.2-6(NH_3)$, $SrCl_2.1-8(NH_3)$, $NiCl.2-6(NH_3)$, $FeCl_2.2-6(NH_3)$, $SnCl_2.0-2.5(NH_3)$, and $NaBF_4.0.5-2.5(NH_3)$.

49. A portable cooler capable of being repeatedly charged at a first location and after each such charge selectively discharged at a selected time and at a selected second location comprising:

a container having a cooling chamber therein, an evaporator in thermal communication with said cooling chamber, a reactor assembly comprising one or more reactors each containing a complex compound formed by adsorbing ammonia on a chloride, bromide, sulphate or chlorate salt of a metal selected from the group consisting of an alkali and alkaline earth metal, chromium, manganese, iron, cobalt, nickel, cadmium, tantalum and rhenium, or a double metal chloride salt, means for charging said portable cooler comprising heating means for being connected to a source of electrical power and in thermal contact with said complex compound for heating said complex compound in said one or more reactors for desorbing said ammonia the from during said charging, conduit means extending between said one or more reactors and said evaporator and in communication therewith for directing said ammonia therebetween, and a valve means cooperating with said conduit means for selectively directing ammonia from said evaporator to said one or more reactors during discharge whereby said evaporator is capable of a temperature of 0° C. or below for cooling said cooling chamber when said heating means is disconnected from said source of electrical power, and wherein said one or more reactors, said conduit, and said evaporator are capable of being charged and discharged at an ammonia operating pressure of atmospheric or above.

* * * * *